US010283074B2

United States Patent
Li et al.

(10) Patent No.: US 10,283,074 B2
(45) Date of Patent: May 7, 2019

(54) METHOD AND APPARATUS FOR ALLOCATING INFORMATION DISPLAY AMOUNT

(71) Applicant: TENCENT TECHNOLOGY (SHENZHEN) COMPANY LIMITED, Shenzhen (CN)

(72) Inventors: Zhenxiao Li, Shenzhen (CN); Ge Chen, Shenzhen (CN); Jia Cheng, Shenzhen (CN); Hongyu Zhao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 150 days.

(21) Appl. No.: 15/200,130

(22) Filed: Jul. 1, 2016

(65) Prior Publication Data

US 2016/0314756 A1    Oct. 27, 2016

Related U.S. Application Data

(63) Continuation of application No. PCT/CN2015/075392, filed on Mar. 30, 2015.

(30) Foreign Application Priority Data

Apr. 1, 2014    (CN) .......................... 2014 1 0128334

(51) Int. Cl.
  *G06T 1/20*     (2006.01)
  *G09G 5/00*     (2006.01)
  *G06Q 30/02*    (2012.01)

(52) U.S. Cl.
  CPC ......... *G09G 5/001* (2013.01); *G06Q 30/0277* (2013.01); *G06T 1/20* (2013.01)

(58) Field of Classification Search
  None
  See application file for complete search history.

(56) References Cited

U.S. PATENT DOCUMENTS

| | | | | |
|---|---|---|---|---|
| 5,487,143 A | * | 1/1996 | Southgate | ............. G06F 3/0481 715/790 |
| 6,876,974 B1 | * | 4/2005 | Marsh | ................. G06Q 10/107 235/383 |

(Continued)

FOREIGN PATENT DOCUMENTS

| CN | 1620812 A | 5/2005 |
|---|---|---|
| CN | 101072133 A | 11/2007 |

(Continued)

OTHER PUBLICATIONS

"Determining a user's location in underground malls using opportunistic advertisement delivery systems", by Takahiro Yamaguchi and Kazumi Takami, TENCON 2011—2011 IEEE Region 10 Conference, pp. 498-502. (Year: 2011).*

(Continued)

*Primary Examiner* — James A Thompson
(74) *Attorney, Agent, or Firm* — Anova Law Group, PLLC

(57) ABSTRACT

A method for allocating an information display amount includes: determining an estimated display amount of unallocated information according to a total original display amount of all information display units and a displayed amount of allocated information; acquiring a predetermined display amount of the unallocated information according to the estimated display amount of the unallocated information; and allocating information displayed by each information display unit and a display amount according to the predetermined display amount of the unallocated information and a remaining display amount of the allocated information.

20 Claims, 7 Drawing Sheets

(56) References Cited

U.S. PATENT DOCUMENTS

| | | | |
|---|---|---|---|
| 9,195,758 B2* | 11/2015 | Parikh | G06F 16/2457 |
| 9,633,018 B2* | 4/2017 | Baecke | G06F 16/48 |
| 2009/0043660 A1* | 2/2009 | Lee | G06Q 30/02 |
| | | | 705/14.25 |
| 2009/0109230 A1 | 4/2009 | Miller et al. | |
| 2012/0150833 A1* | 6/2012 | Parthasarathy | G06F 16/955 |
| | | | 707/706 |
| 2013/0339111 A1* | 12/2013 | Ross | G06Q 30/0241 |
| | | | 705/14.12 |
| 2014/0040029 A1* | 2/2014 | Vhora | H04L 67/22 |
| | | | 705/14.54 |
| 2014/0059588 A1* | 2/2014 | Sakamoto | H04N 21/435 |
| | | | 725/32 |
| 2014/0129324 A1* | 5/2014 | Spivack | G06Q 30/0269 |
| | | | 705/14.45 |

FOREIGN PATENT DOCUMENTS

| | | |
|---|---|---|
| CN | 101986272 A | 3/2011 |
| CN | 102582628 A | 7/2012 |

OTHER PUBLICATIONS

"Cyber-Physical Directory with Optimized Visualization", by Jean-Loup Lamothe, James She, and Xiaoqi Tan, 2014 IEEE 12th International Conference on Dependable, Autonomic and Secure Computing, pp. 271-76. (Year: 2014).*

The World Intellectual Property Organization (WIPO) International Search Report for PCT/CN2015/075392 dated Jul. 7, 2015 p. 1-3.

The State Intellectual Property Office of the People's Republic of China (SIPO) Office Action 1 for 201410128334.7 dated May 25, 2018 18 Pages (including translation).

* cited by examiner

METHOD AND APPARATUS FOR ALLOCATING INFORMATION DISPLAY AMOUNT

CROSS-REFERENCES TO RELATED APPLICATIONS

This application is a continuation of and claims priority of PCT/CN2015/075392 filed on Mar. 30, 2015, which claims priority of Chinese Patent Application No. 2014101283347, filed on Apr. 1, 2014. The entire contents of the two applications are incorporated by reference herein.

FIELD OF THE TECHNOLOGY

The present disclosure relates to the technical field of information processing, and in particular, to a method and an apparatus for allocating an information display amount.

BACKGROUND OF THE DISCLOSURE

Nowadays, Internet technologies are widely applied, and based on Internet applications, an operator gains commercial profits by selecting a manner of displaying information at an information display position in an application. After information and a predetermined display amount of the information are obtained, the predetermined display amount of the information is allocated to an information display position corresponding to the information, so that the information is displayed at the corresponding information display position according to the allocated display amount. Therefore, a method for properly allocating an information display amount is a key to effectively using an information display position.

Currently, as a predetermined display amount of unallocated information is obtained according to a total original information display amount of all information display positions, a displayed amount of allocated information, and a remaining display amount of the allocated information, for the remaining display amount of the allocated information that is included in an information display position corresponding to the allocated information, although the remaining display amount is not actually used for displaying the allocated information, the remaining display amount has been allocated to the allocated information, and therefore, the remaining display amount cannot be allocated to the unallocated information any more, leading to low utilization of the information display position. Therefore, such a manner of allocating an information display amount is improper.

SUMMARY

According to one aspect, a method for allocating an information display amount is provided, including: at a computing device having one or more processors and memory storing programs executed by the one or more processors; acquiring an original display amount of each information display unit, and acquiring a displayed amount of allocated information; determining an estimated display amount of unallocated information according to the original display amount of each information display unit and the displayed amount of the allocated information; acquiring a predetermined display amount of the unallocated information according to the estimated display amount of the unallocated information; and allocating information displayed by each information display unit and a display amount according to the predetermined display amount of the unallocated information and a remaining display amount of the allocated information.

According to another aspect, an apparatus for allocating an information display amount is provided, including: one or more processors; a memory; and one or more program modules stored in the memory and executed by the one or more processors. The one or more program modules include a first acquisition module, configured to acquire an original display amount of each information display unit; a second acquisition module, configured to acquire a displayed amount of allocated information; a first determining module, configured to determine an estimated display amount of unallocated information according to the original display amount of each information display unit that is acquired by the first acquisition module and the displayed amount of the allocated information that is acquired by the second acquisition module; a third acquisition module, configured to acquire a predetermined display amount of the unallocated information according to the estimated display amount of the unallocated information that is determined by the first determining module; and an allocation module, configured to allocate information displayed by each information display unit and a display amount according to the predetermined display amount of the unallocated information that is acquired by the third acquisition module and a remaining display amount of the allocated information.

An estimated display amount of unallocated information is determined according to a displayed amount of allocated information; and information displayed by each information display unit and a display amount are allocated according to a predetermined display amount of the unallocated information that is acquired from the estimated display amount and a remaining display amount of allocated information. Therefore, the remaining display amount of the allocated information then can be allocated to the unallocated information, so that utilization of an information display position is improved, and a manner of allocating an information display amount tends to be proper.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To make the objective, technical solutions, and advantages of the present disclosure clearer, the following further describes the embodiments of the present disclosure in detail with reference to the accompanying drawings.

As a predetermined display amount of unallocated information is obtained according to a remaining display amount of allocated information, although the remaining display amount of the allocated information is not actually used for displaying the allocated information, the remaining display amount cannot be allocated to the unallocated information any more. This may lead to low utilization of an information display position. Therefore, such a manner of allocating an information display amount is improper. In order to enable a remaining display amount of allocated information to be allocated to unallocated information, and improve utilization of an information display position, an embodiment of the present disclosure provides a method for allocating an information display amount. The method for allocating an information display amount is applied to a terminal, an apparatus for allocating an information display amount runs on the terminal, and the apparatus for allocating an information display amount is an apparatus for allocating an information display amount in the following embodiments. The apparatus for allocating an information display amount may allocate a remaining display amount of allocated information again when allocating an information display amount of to-be-allocated information.

Figure 1:
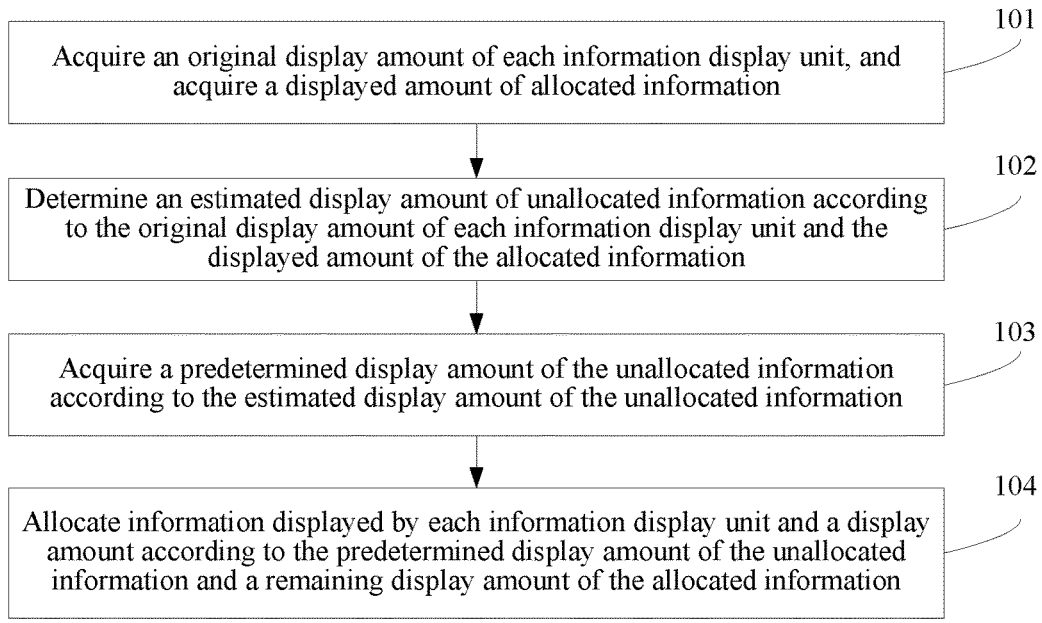
FIG. 1 is a flowchart of a method for allocating an information display amount according to an embodiment of the present disclosure.

An embodiment provides a method for allocating an information display amount. Referring to FIG. 1, a procedure of the method provided by this embodiment is detailed as follows.

101: Acquire an original display amount of each information display unit, and acquire a displayed amount of allocated information.

Optionally, the acquiring an original display amount of each information display unit includes: dividing each information display position into corresponding information display units according to at least one preset targeting condition, and determining an original display amount of each information display unit.

102: Determine an estimated display amount of unallocated information according to the original display amount of each information display unit and the displayed amount of the allocated information.

Optionally, the determining an estimated display amount of unallocated information according to the original display amount of each information display unit and the displayed amount of the allocated information includes: determining a remaining display amount of each information display unit according to the original display amount of each information display unit and the displayed amount of the allocated information; determining an allocated display amount of each information display unit according to the remaining display amount of each information display unit; determining a preset display amount of the unallocated information; determining, according to the allocated display amount of each information display unit, whether allocation of the preset display amount of the unallocated information and a remaining display amount of the allocated information in each information display unit is successful; and determining, if it is determined that allocation of the preset display amount of the unallocated information and the remaining display amount of the allocated information in each information display unit is successful, the preset display amount of the unallocated information as the estimated display amount corresponding to the unallocated information.

Optionally, after the determining, according to the allocated display amount of each information display unit, whether allocation of the preset display amount of the unallocated information and a remaining display amount of the allocated information in each information display unit is successful, the method further includes: resetting the preset display amount of the unallocated information if it is determined that allocation of the preset display amount of the unallocated information and the remaining display amount of the allocated information in each information display unit is unsuccessful, allocating information displayed by each information display unit and a display amount according to the preset display amount of the unallocated information that is reset and the remaining display amount of the allocated information, until allocation is successful, and determining the preset display amount of the unallocated information when allocation is successful, as the estimated display amount of the unallocated information.

Optionally, the determining an allocated display amount of each information display unit according to the remaining display amount of each information display unit includes: determining a reduction proportion, and determining the allocated display amount of each information display unit according to the reduction proportion, and the original display amount and the remaining display amount of each information display unit. The determining, according to the allocated display amount of each information display unit, whether allocation of the preset display amount of the unallocated information and a remaining display amount of the allocated information in each information display unit is successful includes: determining, according to the allocated display amount of each information display unit, whether a total allocated display amount of all the information display units reaches the preset display amount of the unallocated information and the remaining display amount of the allocated information; and determining, if the total allocated display amount of all the information display units reaches the preset display amount of the unallocated information and the remaining display amount of the allocated information, that allocation of the preset display amount of the unallocated information and the remaining display amount of the allocated information in each information display unit is successful.

103: Acquire a predetermined display amount of the unallocated information according to the estimated display amount of the unallocated information.

104: Allocate information displayed by each information display unit and a display amount according to the predetermined display amount of the unallocated information and a remaining display amount of the allocated information.

Optionally, the allocating information displayed by each information display unit and a display amount according to the predetermined display amount of the unallocated information and a remaining display amount of the allocated information includes: determining an information display unit corresponding to the unallocated information and an information display unit corresponding to the allocated information, and determining a remaining display amount of the information display unit corresponding to the unallocated information and a remaining display amount of the information display unit corresponding to the allocated information; and sorting the information display unit corresponding to the unallocated information and the information display unit corresponding to the allocated information according to the remaining display amounts, and allocating the predetermined display amount of the unallocated information and the remaining display amount of the allocated information to a corresponding information display unit according to a sorting result, to obtain the information displayed by each information display unit and the display amount.

Optionally, the determining a remaining display amount of the information display unit corresponding to the unallocated information and a remaining display amount of the information display unit corresponding to the allocated information includes: acquiring, if the targeting condition includes a frequency limit, a frequency discount corresponding to the frequency limit, and determining, according to the frequency discount, the remaining display amount of the information display unit corresponding to the unallocated information and the remaining display amount of the information display unit corresponding to the allocated information.

Optionally, before the acquiring a frequency discount corresponding to the frequency limit, the method further includes: acquiring historical display information of each information display unit within past preset number of days; and determining and storing, according to the historical display information and each preset frequency limit, a frequency discount corresponding to each preset frequency limit.

The acquiring a frequency discount corresponding to the frequency limit includes: selecting, from the stored frequency discounts corresponding to all the preset frequency limits, the frequency discount corresponding to the frequency limit.

Optionally, before the determining an information display unit corresponding to the unallocated information and an information display unit corresponding to the allocated information, the method further includes: combining, if there are at least two information display units corresponding to both the unallocated information and the allocated information, the at least two information display units corresponding to both the unallocated information and the allocated information.

Optionally, before the determining an information display unit corresponding to the unallocated information and an information display unit corresponding to the allocated information, the method further includes: combining, if there are at least two information display units corresponding to neither the unallocated information nor the allocated information, the at least two information display units corresponding to neither the unallocated information nor the allocated information.

According to the method provided by this embodiment, an estimated display amount of unallocated information is determined according to a displayed amount of allocated information; and information displayed by each information display unit and a display amount are allocated according to a predetermined display amount of the unallocated information that is acquired from the estimated display amount and a remaining display amount of allocated information. Therefore, the remaining display amount of the allocated information then can be allocated to the unallocated information, so that utilization of an information display position is improved, and a manner of allocating an information display amount tends to be proper.

To describe the method for allocating an information display amount provided by the foregoing embodiment more clearly, the method for allocating an information display amount is described in detail with reference to the content of the foregoing embodiment and using the following embodiment as an example.

Figure 2:
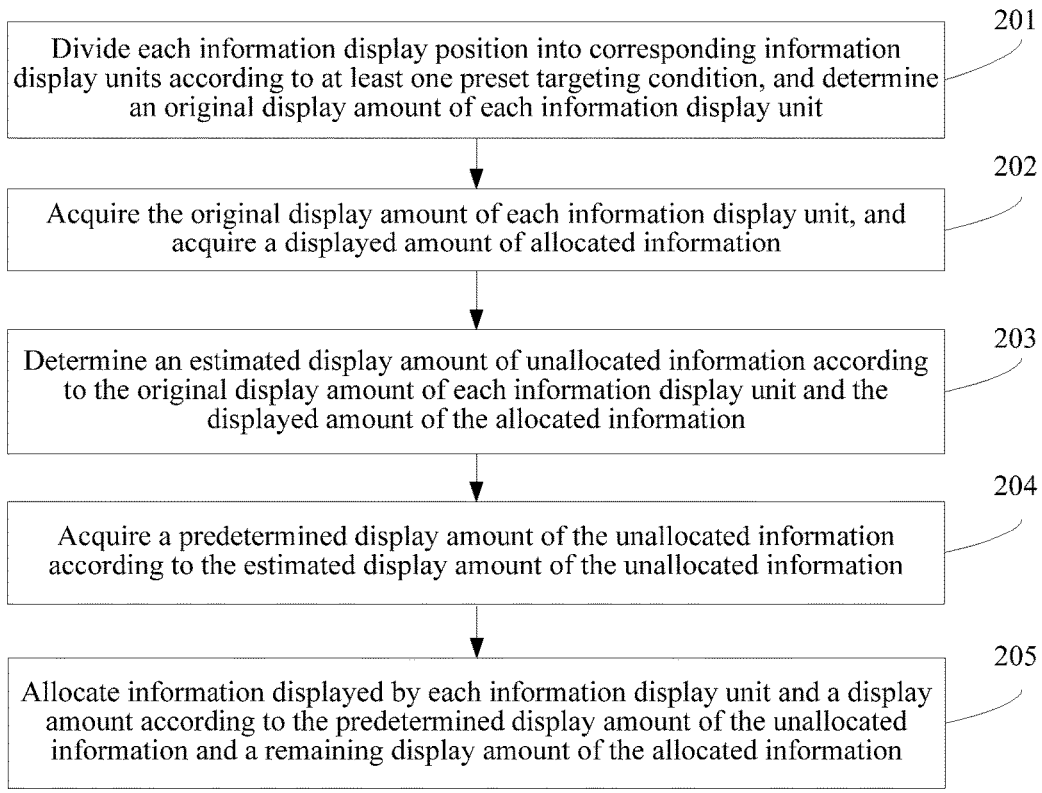
FIG. 2 is a flowchart of a method for allocating an information display amount according to an embodiment of the present disclosure.

An embodiment provides a method for allocating an information display amount. For the convenience of description, in this embodiment, an example in which there are 2 preset targeting conditions: region and gender, where the region includes 3 options: Beijing, Shanghai, and Guangzhou, and the gender includes 2 options: male and female; unallocated information is an advertisement order 1; and targeting conditions corresponding to the advertisement order 1 are: region: Beijing, and gender: male is used to describe in detail the method provided by this embodiment. Referring to FIG. 2, a procedure of the method provided by this embodiment is detailed as follows:

201: Divide each information display position into corresponding information display units according to at least one preset targeting condition, and determine an original display amount of each information display unit.

A method for dividing each information display position into corresponding information display units according to at least one preset targeting condition is not limited in this embodiment. For example, each information display position is divided into corresponding information display units according to each preset targeting condition and each option in each targeting condition.

An example in which there are 2 information display positions: an information display position 1 and an information display position 2 is used. According to the 2 preset targeting conditions: region and gender, each option in the targeting condition "region": Beijing, Shanghai, and Guangzhou, and each option in the targeting condition "gender": male and female, the information display position 1 is divided into 6 corresponding information display units, namely, an information display unit 11: Beijing-male, an information display unit 12: Beijing-female, an information display unit 13: Shanghai-male, an information display unit 14: Shanghai-female, an information display unit 15: Guangzhou-male, and an information display unit 16: Guangzhou-female; and the information display position 2 is divided into 6 corresponding information display units, namely, an information display unit 21: Beijing-male, an information display unit 22: Beijing-female, an information display unit 23: Shanghai-male, an information display unit 24: Shanghai-female, an information display unit 25: Guangzhou-male, and an information display unit 26: Guangzhou-female.

Certainly, a name of an information display position may also be another name, and a specific name of an information display position is not limited in this embodiment. A quantity of information display positions may also be another quantity, and a specific quantity of information display positions is not limited in this embodiment. A name of an information display unit may also be another name, and a specific name of an information display unit is not limited in this embodiment.

In addition, a method for determining an original display amount of each information display unit is not limited in this embodiment, which includes, but is not limited to, if there is a dedicated module configured to determine an original display amount of each information display unit, acquiring the original display amount of each information display unit from the dedicated module.

Still using the foregoing information display units obtained by dividing the information display position 1 and the information display position 2 as an example, an original display amount of each information display unit is acquired from the dedicated module configured to determine the original display amount of each information display unit, as shown in Table 1.

TABLE 1

| Information display unit | Targeting condition | Original display amount |
| --- | --- | --- |
| Information display unit 11 | Beijing-male | 90 |
| Information display unit 12 | Beijing-female | 100 |
| Information display unit 13 | Shanghai-male | 100 |
| Information display unit 14 | Shanghai-female | 100 |
| Information display unit 15 | Guangzhou-male | 100 |
| Information display unit 16 | Guangzhou-female | 100 |
| Information display unit 21 | Beijing-male | 100 |
| Information display unit 22 | Beijing-female | 100 |
| Information display unit 23 | Shanghai-male | 100 |
| Information display unit 24 | Shanghai-female | 100 |
| Information display unit 25 | Guangzhou-male | 100 |
| Information display unit 26 | Guangzhou-female | 100 |

An original display amount of an information display unit may also be another value, and a specific value of an original display amount of an information display unit is not limited in this embodiment.

202: Acquire the original display amount of each information display unit, and acquire a displayed amount of allocated information.

An example in which there is one piece of allocated information, that is, an advertisement order 0, information display units corresponding to the advertisement order 0 are the information display unit 11 and the information display unit 12, and a displayed amount of a display of the advertisement order 0 by the information display unit 11 is 30, and a displayed amount of a display of the advertisement order 0 by the information display unit 12 is 20 is used. The original display amount of each information display unit determined in step 201 and shown in Table 1 is acquired, and the displayed amount 30 of a display of the advertisement order 0 by the information display unit 11 and the displayed amount 20 of a display of the advertisement order 0 by the information display unit 12 are acquired. A name of allocated information may also be another name, and a specific name of allocated information is not limited in this embodiment. A quantity of pieces of allocated information may also be another quantity, and a specific quantity of pieces of allocated information is not limited in this embodiment.

203: Determine an estimated display amount of unallocated information according to the original display amount of each information display unit and the displayed amount of the allocated information.

A specific method for determining an estimated display amount of unallocated information according to the original display amount of each information display unit and the displayed amount of the allocated information is not limited in this embodiment, which includes, but is not limited to, performing the following seven steps to determine the estimated display amount of the unallocated information.

Step 1: Select one piece of information from the unallocated information and the allocated information.

The selected information is unallocated information or allocated information.

A specific manner of selecting one piece of information from the unallocated information and the allocated information is not limited in this embodiment. For example, one piece of information is randomly selected from the unallocated information and the allocated information, or a sum of original display amounts of information display units corresponding to the unallocated information is determined, a sum of original display amounts of information display units corresponding to the allocated information is determined, the unallocated information and the allocated information are sorted according to the sums of the original display amounts, and one piece of information is selected in ascending order of the sums of the original display amounts.

Step 2: Determine a remaining display amount of each information display unit according to the original display amount of each information display unit and the displayed amount of the allocated information.

In specific implementation, if step 2 is performed the first time, a difference between the original display amount of each information display unit and the displayed amount of the allocated information is used as the remaining display amount of each information display unit. If step 2 is not performed the first time, if an allocated amount of the allocated information is determined after step 2 is performed previously, a difference between the original display amount of each information display unit and the displayed amount of the allocated information is used as a first value, a sum of allocated display amounts, where each of the allocated display amounts is determined after step 2 is performed each time, is used as a second value, and a difference between the first value and the second value is used as the remaining display amount of each information display unit.

Using step 2 being performed the first time, the selected information being the unallocated information, the original display amount of each information display unit shown in Table 1, and the advertisement order 0 as an example, the remaining display amount of each information display unit is determined as shown in Table 2.

TABLE 2

| Information display unit | Targeting condition | Original display amount | Remaining display amount |
| --- | --- | --- | --- |
| Information display unit 11 | Beijing-male | 90 | 60 |
| Information display unit 12 | Beijing-female | 100 | 80 |
| Information display unit 13 | Shanghai-male | 100 | 100 |
| Information display unit 14 | Shanghai-female | 100 | 100 |

TABLE 2-continued

| Information display unit | Targeting condition | Original display amount | Remaining display amount |
|---|---|---|---|
| Information display unit 15 | Guangzhou-male | 100 | 100 |
| Information display unit 16 | Guangzhou-female | 100 | 100 |
| Information display unit 21 | Beijing-male | 100 | 100 |
| Information display unit 22 | Beijing-female | 100 | 100 |
| Information display unit 23 | Shanghai-male | 100 | 100 |
| Information display unit 24 | Shanghai-female | 100 | 100 |
| Information display unit 25 | Guangzhou-male | 100 | 100 |
| Information display unit 26 | Guangzhou-female | 100 | 100 |

A remaining display amount of an information display unit may also be another value, and a specific value of a remaining display amount of an information display unit is not limited in this embodiment.

It should be noted that, to better explain step 203 in this embodiment, an example in which the selected information is the unallocated information is used in this embodiment.

Step 3: Determine an allocated display amount of each information display unit according to the remaining display amount of each information display unit.

In this embodiment, a specific method for determining an allocated display amount of each information display unit according to the remaining display amount of each information display unit is not limited, for example, when the selected information is the allocated information, the remaining display amount of each information display unit is determined as the allocated display amount of each information display unit. When the selected information is the unallocated information, a reduction proportion r is determined, and the allocated display amount of each information display unit is determined according to r, and the original display amount and the remaining display amount of each information display unit.

A specific method for determining r is not limited in this embodiment. For example, a quotient obtained by dividing the minimum remaining display amount in the remaining display amounts of all the information display units by 100 is determined as r.

Using the remaining display amount of each information display unit shown in Table 2, a quotient 0.7 obtained by dividing the minimum remaining display amount 70 in the remaining display amounts of all the information display units by 100 is determined as r.

In addition, a specific method for determining the allocated display amount of each information display unit according to r, and the original display amount and the remaining display amount of each information display unit is not limited in this embodiment either. For example, the allocated display amount of each information display unit is determined by using the following formula: an allocated display amount of an information display unit i=min(r×an original display amount of the information display unit i, and a remaining display amount of the information display unit i).

Still using the remaining display amount of each information display unit shown in Table 2, and r=0.7 as an example, the allocated display amount of each information display unit is determined according to the formula: the allocated display amount of the information display unit i=min(r×the original display amount of the information display unit i, and the remaining display amount of the information display unit i), as shown in Table 3.

TABLE 3

| Information display unit | Targeting condition | Original display amount | Remaining display amount | r × original display amount | Allocated display amount |
|---|---|---|---|---|---|
| Information display unit 11 | Beijing-male | 90 | 60 | 63 | 60 |
| Information display unit 12 | Beijing-female | 100 | 80 | 70 | 70 |
| Information display unit 13 | Shanghai-male | 100 | 100 | 70 | 70 |
| Information display unit 14 | Shanghai-female | 100 | 100 | 70 | 70 |
| Information display unit 15 | Guangzhou-male | 100 | 100 | 70 | 70 |
| Information display unit 16 | Guangzhou-female | 100 | 100 | 70 | 70 |
| Information display unit 21 | Beijing-male | 100 | 100 | 70 | 70 |
| Information display unit 22 | Beijing-female | 100 | 100 | 70 | 70 |
| Information display unit 23 | Shanghai-male | 100 | 100 | 70 | 70 |
| Information display unit 24 | Shanghai-female | 100 | 100 | 70 | 70 |
| Information display unit 25 | Guangzhou-male | 100 | 100 | 70 | 70 |
| Information display unit 26 | Guangzhou-female | 100 | 100 | 70 | 70 |

In addition to determining the allocated display amount of each information display unit by using the formula: the allocated display amount of the information display unit i=min(r×the original display amount of the information display unit i, and the remaining display amount of the information display unit i), the allocated display amount of each information display unit may be further determined by using the following method. For example:

If a targeting condition corresponding to the selected information includes a frequency limit: the maximum number of times (c times) that the selected information is played for each user in certain time length duration (d days), a frequency discount f(d, c) corresponding to the frequency limit is acquired, and the allocated display amount of each information display unit is determined by using the following formula: the allocated display amount of the information display unit i=min(r×the original display amount of the information display unit i, and the remaining display amount of the information display unit×f(d, c)).

Still using the remaining display amount of each information display unit shown in Table 2, r=0.7, and f(d, c)=0.5 as an example, the allocated display amount of each information display unit is determined according to the formula: the allocated display amount of the information display unit i=min(r×the original display amount of the information display unit i, and the remaining display amount of the information display unit i×f(d, c)), as shown in Table 4.

TABLE 4

| Information display unit | Targeting condition | Original display amount | Remaining display amount | r × original display amount | f(d, c) × remaining display amount | Allocated display amount |
| --- | --- | --- | --- | --- | --- | --- |
| Information display unit 11 | Beijing-male | 90 | 60 | 63 | 30 | 30 |
| Information display unit 12 | Beijing-female | 100 | 80 | 70 | 40 | 40 |
| Information display unit 13 | Shanghai-male | 100 | 100 | 70 | 50 | 50 |
| Information display unit 14 | Shanghai-female | 100 | 100 | 70 | 50 | 50 |
| Information display unit 15 | Guangzhou-male | 100 | 100 | 70 | 50 | 50 |
| Information display unit 16 | Guangzhou-female | 100 | 100 | 70 | 50 | 50 |
| Information display unit 21 | Beijing-male | 100 | 100 | 70 | 50 | 50 |
| Information display unit 22 | Beijing-female | 100 | 100 | 70 | 50 | 50 |
| Information display unit 23 | Shanghai-male | 100 | 100 | 70 | 50 | 50 |
| Information display unit 24 | Shanghai-female | 100 | 100 | 70 | 50 | 50 |
| Information display unit 25 | Guangzhou-male | 100 | 100 | 70 | 50 | 50 |
| Information display unit 26 | Guangzhou-female | 100 | 100 | 70 | 50 | 50 |

Where f(d, c) may also be another value, and a specific value of f(d, c) is not limited in this embodiment.

In addition, a specific method for acquiring a frequency discount corresponding to the frequency limit is not limited in this embodiment, which includes, but is not limited to, if a frequency discount corresponding to each preset frequency limit is prestored, selecting the frequency discount corresponding to the frequency limit from the stored frequency discounts corresponding to all the preset frequency limits.

An example in which a frequency limit included in the targeting conditions of the advertisement order 1 is that: the maximum number of times that the advertisement order 1 is played within 2 days for each user is 3 is used, and if a prestored frequency discount corresponding to each preset frequency limit is shown in Table 5, a frequency discount corresponding to the frequency limit and selected from the stored frequency discounts corresponding to all the preset frequency limits is f(2, 3).

TABLE 5

| Frequency limit (d, c) | Frequency discount f(d, c) |
| --- | --- |
| (1, 1) | f(1, 1) |
| (1, 2) | f(1, 2) |
| ... | ... |
| (1, 99) | f(1, 99) |
| (2, 1) | f(2, 1) |
| (2, 2) | f(2, 2) |
| (2, 3) | (2, 3) |
| ... | ... |
| (2, 99) | f(2, 99) |
| (99, 1) | f(99, 1) |
| ... | ... |
| (99, 99) | f(99, 99) |

In addition, a specific method for pre-storing a frequency discount corresponding to each preset frequency limit is not limited in this embodiment either, for example, historical display information of each information display unit within past preset number of days is acquired; and the frequency discount corresponding to each preset frequency limit is determined and stored according to the historical display information and each preset frequency limit.

First, the historical display information within the past preset number of days is acquired.

Second, an integer value is successively selected from a first preset value to a second preset value, as d, and historical display information every d days is separately acquired from the acquired historical display information.

Third, an integer value is successively selected from a third preset value to a fourth preset value, as the number n of recommendation times, a proportion that a same piece of information is recommended for n times every d days is determined separately according to the historical display information every d days, and a quotient obtained by dividing a proportion that a same piece of information is recommended for n times every d days by [preset number of days/d] is determined as an average proportion p(d, n) that the same piece of information is recommended for n times within d days.

Finally, an integer value is successively selected from the third preset value to the fourth preset value, as c, and the frequency discount f(d, c) corresponding to (d, c) is calculated according to a formula: $f(d, c) = \Sigma_{n=1}^{c} p(d, n) + \Sigma_{n=c+1}^{fourth\ preset\ value} p(d, n)$.

For a step of determining, according to historical display information every d days, a proportion that a same piece of information is recommended for n times every d days, a specific determining method is not limited in this embodiment, which includes, but is not limited to, if the acquired historical display information every d days at least includes: a quantity of different users every d days and the number of recommendation times that each information display unit recommends same information to a same user every d days, determining a quantity of users to whom each information display unit correspondingly recommends for n times, the user being a user to whom each information display unit recommends same information for n times in the historical display information; determining a quotient obtained by dividing, by the quantity of different users every d days, a sum of the quantities of users to whom all the information display units correspondingly recommend for n times, as the proportion that a same piece of information is recommended for n times every d days.

An example in which a preset number of days is 180, the first preset value is 1, the second preset value is 99, the third preset value is 1, the fourth preset value is 99, and there are two information display units: the information display unit 1 and the information display unit 2 is used, first, historical display information within past 180 days is acquired; and second, an integer value is successively selected from 1 to 99, as d, for example, it is selected that d=90. Historical display information every 90 days is separately acquired from the acquired historical display information.

Third, an integer value is successively selected from 1 to 99, as the number n of recommendation times, for example, it is selected that n=2, a quantity 10 of users to whom the information display unit 1 correspondingly recommends for 2 times is determined, and a quantity 20 of users to whom the information display unit 2 correspondingly recommends for 2 times is determined. If a quantity of different users within the first 90 days is 100, and a quantity of different users within the last 90 days is 200 in the historical display information within the past 180 days, a quotient 0.3 obtained by dividing, by the quantity 100 of different users within the first 90 days, a sum 30 of the users to whom the information display units correspondingly recommend for 2 times is determined as a proportion that a same piece of information is recommended for 2 times within the first 90 days, and a quotient 0.15 obtained by dividing 30 by the quantity 200 of different users within the last 90 days is determined as a proportion that the same piece of information is recommended for 2 times within the last 90 days. A quotient 0.225 obtained by dividing the sum of the proportions that the same piece of information is recommended for 2 times every 90 days, that is, 0.3+0.15=0.45 by $\lfloor 180/90 \rfloor$=2 is determined as an average proportion that the same piece of information is recommended for 2 times within 90 days, that is, p(90, 2)=0.225.

Finally, an integer value 3 is successively selected from 1 to 99, as c, and a frequency discount f(90, 3) corresponding to (90, 3) is calculated according to a formula:

$$f(90, 3) = \sum_{n=1}^{3} p(90, n) + \sum_{n=4}^{99} p(90, n).$$

Certainly, the preset number of days, the first preset value, the second preset value, the third preset value, the fourth preset value, the quantity of different users within the first 90 days, and the quantity of different users within the last 90 days may all be other values, and specific values of the preset number of days, the first preset value, the second preset value, the third preset value, the fourth preset value, the quantity of different users within the first 90 days, and the quantity of different users within the last 90 days are not limited in this embodiment.

Step 4: If the selected information is unallocated information, determine a preset display amount of the unallocated information; and if the selected information is allocated information, determine a remaining display amount of the allocated information.

A specific method for determining a preset display amount of the unallocated information is not limited in this embodiment. For example, information display units corresponding to the unallocated information are determined, and a sum of remaining display amounts of the information display units corresponding to the unallocated information is determined as the preset display amount of the unallocated information.

An example in which the unallocated information is the advertisement order 1 is used. According to the targeting conditions corresponding to the advertisement order 1: region: Beijing, and gender: male, it is determined that the information display units corresponding to the advertisement order 1 are the information display unit 11 and the information display unit 21. It is determined, according to the remaining display amount of each information display unit shown in Table 2, that the preset display amount of the advertisement order 1 is a sum 180 of the remaining display amount 80 of the information display unit 11 and the remaining display amount 100 of the information display unit 21.

Step 5: Determine, according to the allocated display amount of each information display unit, whether allocation of a display amount of the selected information in each information display unit is successful, if it is determined that allocation of the display amount of the selected information in each information display unit is successful, perform step 6, and if it is determined that allocation of the display amount of the selected information in each information display unit is unsuccessful, perform step 7.

A specific method for determining, according to the allocated display amount of each information display unit, whether allocation of a display amount of the selected information in each information display unit is successful is not limited in this embodiment, which includes, but is not limited to, if the selected information is the allocated information, obtaining an average value of remaining display amounts of the selected allocated information according to a quantity of information display units corresponding to the selected allocated information, and using the average value as the allocated display amount of the allocated information, and if none of the allocated display amounts of all the information display units corresponding to the allocated information is less than the allocated display amount of the allocated information, determining that allocation of the display amount of the selected information in each information display unit is successful.

If the selected information is the unallocated information, it is determined, according to the allocated display amount of each information display unit, whether a total allocated display amount of all the information display units reaches the preset display amount of the unallocated information and the remaining display amount of the allocated information; and it is determined, if the total allocated display amount of all the information display units reaches the preset display amount of the unallocated information and the remaining display amount of the allocated information, that allocation of the preset display amount of the unallocated information and the remaining display amount of the allocated information in each information display unit is successful.

For example, according to the allocated display amount 70 of the information display unit 11 and the allocated display amount 70 of the information display unit 21, where the information display unit 11 and the information display unit 21 correspond to the advertisement order 1, it is determined that a total allocated display amount 140 of the information display units does not reach the preset display amount 180 of the advertisement order 1, and then, it is determined that allocation of the preset display amount of the unallocated information and the remaining display amount of the allocated information in each information display unit is unsuccessful.

In addition, in this embodiment, in specific implementation, the total allocated display amount of all the information display units often does not reach the preset display amount of the unallocated information or the remaining display amount of the allocated information; therefore, a first threshold may be preset. If a difference between the total allocated display amount of all the information display units and the preset display amount of the allocated information and a difference between the total allocated display amount of all the information display units and the remaining display amount of the allocated information are not greater than the first threshold, it is determined that allocation of the preset display amount of the unallocated information and the remaining display amount of the allocated information in each information display unit is successful.

An example in which the first threshold is 40 is used. According to the allocated display amount 70 of the information display unit 11 and the allocated display amount 70 of the information display unit 21, where the information display unit 11 and the information display unit 21 correspond to the advertisement order 1, it is determined that the total allocated display amount 140 of the information display units does not reach the preset display amount 180 of the advertisement order 1, and a difference 40 between the preset display amount 180 of the advertisement order 1 and the total allocated display amount 140 of the information display units is equal to the first threshold 40, and then, it is determined that allocation of the preset display amount of the unallocated information and the remaining display amount of the allocated information in each information display unit is unsuccessful. Certainly, the first threshold may also be another value, and a specific value of the preset threshold is not limited in this embodiment.

It should be noted that, if it is determined that allocation of the display amount of the selected information in each information display unit is successful, and in step 3, the allocated display amount of each information display unit is determined by setting r, before step 7 is performed, r may also be reset, the allocated display amount of each information display unit is re-determined according to the reset r, and it is determined, according to the allocated display amount of each information display unit, whether allocation of the display amount of the selected information in each information display unit is successful. If allocation is successful in an iteration process in which a difference between r that is set last time and r that is set this time is less than a second threshold, it is regarded that allocation of the display amount of the selected information in each information display unit is successful, and step 6 is performed. If allocation is unsuccessful in the iteration process in which the difference between r that is set last time and r that is set this time is less than the second threshold, it is regarded that allocation of the display amount of the selected information in each information display unit is unsuccessful, and step 7 is performed.

It should be noted that, in this case, a specific implementation manner of re-determining the allocated display amount of each information display unit according to the reset r is the same as a specific implementation step of determining the allocated display amount of each information display unit according to r, and the original display amount and the remaining display amount of each information display unit in step 3, but a difference only lies in that, in specific implementation, a used value of r is changed to a value of the reset r at this time.

A specific method for resetting the reduction proportion is not limited in this embodiment, which includes, but is not limited to, resetting the reduction proportion by using the dichotomy.

Step 6: Repeat step 1 to step 5, until all to-be-allocated information and the allocated information are all allocated successfully, and determine the preset display amount of the unallocated information when allocation is successful, as the estimated display amount of the unallocated information.

Step 7: Reset the preset display amount of the unallocated information, and allocate information displayed by each information display unit and a display amount according to the preset display amount of the unallocated information that is reset and the remaining display amount of the allocated information, until allocation is successful, and determine the preset display amount of the unallocated information when allocation is successful, as the estimated display amount of the unallocated information.

A specific method for resetting the preset display amount of the unallocated information is not limited in this embodiment. For example, the preset display amount of the unallocated information is reset by using the dichotomy.

For the foregoing steps, in this embodiment, an example in which the selected information is the unallocated information is used. To describe more clearly in an actual application, for displayed information and information that is not displayed, how to apply the method for determining an estimated display amount of unallocated information according to an original display amount of each information display unit and a displayed amount of allocated information provided by this embodiment, the displayed information being the advertisement order 0, corresponding information display units being the information display unit 11 and the information display unit 12, the information that is not displayed being the advertisement order 1, corresponding information display units being the information display unit 11 and the information display unit 21, a displayed amount of a display of the advertisement order 0 by the information display unit 11 being 30, a displayed amount of a display of the advertisement order 0 by the information display unit 12 being 20, the remaining display amount of the advertisement order 0 being 100, and the original display amount of each information display unit shown in Table 1 are used as an example to explain step 203 provided by this embodiment.

For the advertisement order 0, in step 1, it is determined, according to Table 1, the original display amount 90 of the information display unit 11, and the original display amount 100 of the information display unit 12, that a sum of the original display amounts of the information display units corresponding to the advertisement order 0 is 190. For the advertisement order 1, it is determined, according to Table 1, the original display amount 100 of the information display unit 11, and the original display amount 100 of the information display unit 21, that a sum of the original display amounts of the information display units corresponding to the advertisement order 1 is 200. Therefore, a result obtained by sorting the advertisement order 0 and the advertisement order 1 in ascending order of the sums of the original display amounts is that the advertisement order 0 is ranked before the advertisement order 1. The advertisement order 0 with the minimum remaining display amount is selected.

Step 2 is performed: because step 2 is performed the first time, a difference between the original display amount of each information display unit and the displayed amount of the advertisement order 0 is used as the remaining display amount of each information display unit, to obtain Table 6.

TABLE 6

| Information display unit | Targeting condition | Original display amount | Remaining display amount |
|---|---|---|---|
| Information display unit 11 | Beijing-male | 90 | 60 |
| Information display unit 12 | Beijing-female | 100 | 80 |
| Information display unit 13 | Shanghai-male | 100 | 100 |
| Information display unit 14 | Shanghai-female | 100 | 100 |
| Information display unit 15 | Guangzhou-male | 100 | 100 |
| Information display unit 16 | Guangzhou-female | 100 | 100 |
| Information display unit 21 | Beijing-male | 100 | 100 |
| Information display unit 22 | Beijing-female | 100 | 100 |
| Information display unit 23 | Shanghai-male | 100 | 100 |
| Information display unit 24 | Shanghai-female | 100 | 100 |
| Information display unit 25 | Guangzhou-male | 100 | 100 |
| Information display unit 26 | Guangzhou-female | 100 | 100 |

Step 3 is performed: because the selected information: the advertisement order 0 is the allocated information, the remaining display amount of the information display unit is determined as the allocated display amount of each information display unit, to obtain Table 7.

TABLE 7

| Information display unit | Targeting condition | Original display amount | Remaining display amount | Allocated display amount |
|---|---|---|---|---|
| Information display unit 11 | Beijing-male | 90 | 60 | 60 |
| Information display unit 12 | Beijing-female | 100 | 80 | 70 |
| Information display unit 13 | Shanghai-male | 100 | 100 | 100 |
| Information display unit 14 | Shanghai-female | 100 | 100 | 100 |
| Information display unit 15 | Guangzhou-male | 100 | 100 | 100 |
| Information display unit 16 | Guangzhou-female | 100 | 100 | 100 |
| Information display unit 21 | Beijing-male | 100 | 100 | 100 |
| Information display unit 22 | Beijing-female | 100 | 100 | 100 |
| Information display unit 23 | Shanghai-male | 100 | 100 | 100 |
| Information display unit 24 | Shanghai-female | 100 | 100 | 100 |
| Information display unit 25 | Guangzhou-male | 100 | 100 | 100 |
| Information display unit 26 | Guangzhou-female | 100 | 100 | 100 |

Step 4 is performed: the remaining display amount 100 of the advertisement order 0 is determined.

Step 5 is performed: an average value of the remaining display amounts of the advertisement order 0 is obtained according to the quantity 2 of the information display units corresponding to the advertisement order 0, that is, 100/2=50, 50 is used as the allocated display amount of the allocated information, and none of the allocated display amounts of the information display units corresponding to the advertisement order 0 is less than 50, then, it is determined that allocation of the remaining display amount of the advertisement order 0 in each information display unit is successful.

Step 6 is performed: step 1 is repeated, a next advertisement order 1 of the advertisement order 0 is selected in ascending order of the sums of the original display amounts, and step 2 is performed.

For step 2, because step 2 is not performed the first time, the difference between the original display amount of each information display unit and the displayed amount of the advertisement order 0 is used as the first value, the allocated display amount 50 of the advertisement order 0 determined in step 5 when the advertisement order 0 is selected last time is used as the second value, and the difference between the first value and the second value is used as the remaining display amount of the information display unit, to obtain Table 8.

TABLE 8

| Information display unit | Targeting condition | Original display amount | First value | Second value | Remaining display amount |
|---|---|---|---|---|---|
| Information display unit 11 | Beijing-male | 90 | 60 | 50 | 10 |
| Information display unit 12 | Beijing-female | 100 | 80 | 50 | 30 |
| Information display unit 13 | Shanghai-male | 100 | 100 | 0 | 100 |
| Information display unit 14 | Shanghai-female | 100 | 100 | 0 | 100 |
| Information display unit 15 | Guangzhou-male | 100 | 100 | 0 | 100 |
| Information display unit 16 | Guangzhou-female | 100 | 100 | 0 | 100 |
| Information display unit 21 | Beijing-male | 100 | 100 | 0 | 100 |
| Information display unit 22 | Beijing-female | 100 | 100 | 0 | 100 |
| Information display unit 23 | Shanghai-male | 100 | 100 | 0 | 100 |
| Information display unit 24 | Shanghai-female | 100 | 100 | 0 | 100 |
| Information display unit 25 | Guangzhou-male | 100 | 100 | 0 | 100 |
| Information display unit 26 | Guangzhou-female | 100 | 100 | 0 | 100 |

Step 3 is performed: because the selected information: the advertisement order 1 is the unallocated information, a quotient 0.7 obtained by dividing the minimum remaining display amount 70 in the remaining display amounts of all the information display units in Table 8 by 100 is determined as r. The allocated display amount of each information display unit is determined according to the formula: the allocated display amount of the information display unit i=min(r×the original display amount of the information display unit i, and the remaining display amount of the information display unit i), as shown in Table 9.

TABLE 9

| Information display unit | Targeting condition | Original display amount | Remaining display amount | r × original display amount | Allocated display amount |
|---|---|---|---|---|---|
| Information display unit 11 | Beijing-male | 90 | 10 | 63 | 10 |
| Information display unit 12 | Beijing-female | 100 | 30 | 70 | 30 |
| Information display unit 13 | Shanghai-male | 100 | 100 | 70 | 70 |
| Information display unit 14 | Shanghai-female | 100 | 100 | 70 | 70 |
| Information display unit 15 | Guangzhou-male | 100 | 100 | 70 | 70 |
| Information display unit 16 | Guangzhou-female | 100 | 100 | 70 | 70 |
| Information display unit 21 | Beijing-male | 100 | 100 | 70 | 70 |
| Information display unit 22 | Beijing-female | 100 | 100 | 70 | 70 |
| Information display unit 23 | Shanghai-male | 100 | 100 | 70 | 70 |
| Information display unit 24 | Shanghai-female | 100 | 100 | 70 | 70 |
| Information display unit 25 | Guangzhou-male | 100 | 100 | 70 | 70 |
| Information display unit 26 | Guangzhou-female | 100 | 100 | 70 | 70 |

Step 4 is performed: the information display unit 11 and the information display unit 21 that correspond to the advertisement order 1 are determined, and a sum 110 of the remaining display amount 10 of the information display unit 11 and the remaining display amount 100 of the information display unit 21 is determined as the preset display amount of the advertisement order 1.

Step 5 is performed: according to the allocated display amount 10 of the information display unit 11 and the allocated display amount 70 of the information display unit 21, where the information display unit 11 and the information display unit 21 correspond to the advertisement order 1, it is determined that a total allocated display amount 80 of the information display units does not reach the preset display amount 110 of the advertisement order 1, and then, it is determined that allocation of the preset display amount of the unallocated information and the remaining display amount of the allocated information in each information display unit is unsuccessful.

The step of re-determining 0.7/2=0.35 as r by using the dichotomy, re-determining the allocated display amount of each information display unit according to the reset r, and determining, according to the allocated display amount of each information display unit, whether allocation of a display amount of the selected information in each information display unit is successful, and subsequent steps are performed.

204: Acquire a predetermined display amount of the unallocated information according to the estimated display amount of the unallocated information.

A specific method for acquiring a predetermined display amount of the unallocated information according to the estimated display amount of the unallocated information is not limited in this embodiment. For example, the estimated display amount of the unallocated information is displayed by using a display device, so that a user can acquire the estimated display amount of the unallocated information by using the display device, determine the predetermined display amount of the unallocated information according to the estimated display amount, and then, input the predetermined display amount by using an input device; and the predetermined display amount input by using the input device is acquired.

205: Allocate information displayed by each information display unit and a display amount according to the predetermined display amount of the unallocated information and a remaining display amount of the allocated information.

A specific method for allocating information displayed by each information display unit and a display amount according to the predetermined display amount of the unallocated information and a remaining display amount of the allocated information is not limited in this embodiment. For example, an information display unit corresponding to the unallocated information and an information display unit corresponding to the allocated information are determined, and a remaining display amount of the information display unit corresponding to the unallocated information and a remaining display amount of the information display unit corresponding to the allocated information are determined; and the information display unit corresponding to the unallocated information and the information display unit corresponding to the allocated information are sorted according to the remaining display amounts, and the predetermined display amount of the unallocated information and the remaining display amount of the allocated information are allocated to a corresponding information display unit according to a sorting result, to obtain the information displayed by each information display unit and the display amount.

Figure 3:
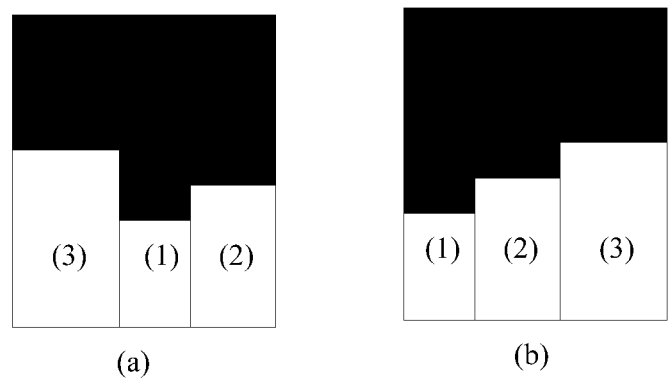
FIG. 3 is schematic diagrams of information display units before and after sorting according to an embodiment of the present disclosure.

An example in which the allocated information is the advertisement order 0, the unallocated information is the advertisement order 1, the remaining display amount of the advertisement order 0 is 100, and the predetermined display amount of the advertisement order 1 is 100 is used. It is determined that the information display units corresponding to the advertisement order 0 are the information display unit 11 and the information display unit 12, and the information display units corresponding to the advertisement order 1 are the information display unit 11 and the information display unit 21. If the remaining display amount of the information display unit 11 is 60, the remaining display amount of the information display unit 12 is 80, and the remaining display amount of the information display unit 21 is 100, the information display units corresponding to the advertisement order 0 and the advertisement order 11 are sorted according to the remaining display amounts, and an order is as follows: the information display unit 11, the information display unit 12, and the information display unit 21. As shown in FIG. 3, a block (1) represents the information display unit 11, a block (2) represents the information display unit 12, and a block (3) represents the information display unit 21. For each block, the black part represents a displayed amount of a display by the information display unit, the white part represents the remaining display amount of the information display unit, and after the blocks (3), (1), and (2) that are not sorted in FIG. 3(a) are sorted, the blocks (1), (2), and (3) in FIG. 3(b) are obtained, and the predetermined display amount 100 of the unallocated information and the remaining display amount 100 of the allocated information are allocated to a corresponding information display unit according to the sorting result, to obtain the information displayed by each information display unit and the display amount.

In addition, a specific method for allocating the predetermined display amount of the unallocated information and the remaining display amount of the allocated information to a corresponding information display unit according to a sorting result, to obtain the information displayed by each information display unit and the display amount is not limited in this embodiment, which includes, but is not limited to, if r when allocation is successful and an allocation order when allocation is successful are stored when the estimated display amount of the unallocated information is determined, if the allocation order when allocation is successful is the same as the sorting result, performing step 203 according to r, to allocate the predetermined display amount of the unallocated information and the remaining display amount of the allocated information to the corresponding information display unit.

An example in which the allocated information is the advertisement order 0, the unallocated information is the advertisement order 1, the remaining display amount of the advertisement order 0 is 100, and the predetermined display amount of the advertisement order 1 is 100 is still used, if r when allocation is successful that is stored when the unallocated information of the estimated display amount is determined is 0.7 and the allocation order when allocation is successful is as follows: the advertisement order 0, and the advertisement order 1, and the allocation order when allocation is successful is the same as the sorting result, the information display unit 11 allocates 50 of the remaining display amount of the advertisement order 0, and the information display unit 12 allocates 50 of the remaining display amount of the advertisement order 0; and the information display unit 11 allocates 20 of the remaining display amount of the advertisement order 1, and the information display unit 21 allocates 80 of the remaining display amount of the advertisement order 1.

In addition, a specific method for determining a remaining display amount of the information display unit corresponding to the unallocated information and a remaining display amount of the information display unit corresponding to the allocated information is not limited in this embodiment, which includes, but is not limited to, acquiring, if the targeting condition includes a frequency limit, a frequency discount corresponding to the frequency limit, and determining, according to the frequency discount, an original remaining display amount of the information display unit corresponding to the unallocated information and an original remaining display amount of the information display unit corresponding to the allocated information.

It should be noted that, there are a large number of targeting conditions in specific implementation of the method provided by this embodiment, so that, there may are hundreds of millions of corresponding information display units obtained by dividing all the information display positions according to at least one preset targeting condition, which increases an allocation time of allocating an information display amount by using the method provided by this embodiment. In order to reduce the allocation time of the method provided by this embodiment, after each information display position is divided into the corresponding information display units according to the at least one preset targeting condition, and the allocated information of the unallocated information is determined, it may be further first determined whether there are at least two information display units corresponding to both the unallocated information and the allocated information, and if there are at least two information display units corresponding to both the unallocated information and the allocated information, the at least two information display units corresponding to both the unallocated information and the allocated information are combined. An information display unit obtained through combination is used as an information display unit in the method for allocating an information display amount provided by this embodiment.

Each information display unit shown in Table 10, the unallocated information being the advertisement order 2, the advertisement order 2 corresponding to the information display unit 11, the information display unit 12, the information display unit 21, the information display unit 22, the allocated information being an advertisement order 3, and the advertisement order 3 corresponding to information display unit 11 and the information display unit 12 are used as an example. It is determined that information display units corresponding to both the advertisement order 2 and the advertisement order 3 are the information display unit 11 and the information display unit 12. The information display unit 11 and the information display unit 12 are combined into the information display unit 01, and the information display unit 01 is used as an information display unit in the method for allocating an information display amount provided by this embodiment, as shown in Table 11.

TABLE 10

| Information display unit | Information display unit | Information display unit | Information display unit |
|---|---|---|---|
| Information display unit 11 | Information display unit 14 | Information display unit 21 | Information display unit 24 |
| Information display unit 12 | Information display unit 15 | Information display unit 22 | Information display unit 25 |
| Information display unit 13 | Information display unit 16 | Information display unit 23 | Information display unit 26 |

TABLE 11

| Information display unit | Information display unit | Information display unit | Information display unit |
|---|---|---|---|
| Information display unit 01 | Information display unit 15 | Information display unit 22 | Information display unit 25 |
| Information display unit 13 | Information display unit 16 | Information display unit 23 | Information display unit 26 |

TABLE 11-continued

| Information display unit | Information display unit | Information display unit | Information display unit |
| --- | --- | --- | --- |
| Information display unit 14 | Information display unit 21 | Information display unit 24 | |

In addition to that, after each information display position is divided into the corresponding information display units according to the at least one preset targeting condition, and the allocated information of the unallocated information is determined, it may be further first determined whether there are at least two information display units corresponding to neither the unallocated information nor the allocated information, and if there are at least two information display units corresponding to neither the unallocated information nor the allocated information, the at least two information display units corresponding to neither the unallocated information nor the allocated information are combined. An information display unit obtained through combination is used as an information display unit in the method for allocating an information display amount provided by this embodiment.

Each information display unit shown in Table 10, the unallocated information being the advertisement order 2, the advertisement order 2 corresponding to the information display unit 11, the information display unit 12, the information display unit 21, the information display unit 22, the allocated information being the advertisement order 3, and the advertisement order 3 corresponding to information display unit 11 and the information display unit 12 are still used as an example. It is determined that information display units corresponding to neither the advertisement order 2 nor the advertisement order 3 are the information display unit 13, the information display unit 14, the information display unit 15, the information display unit 16, the information display unit 23, the information display unit 24, the information display unit 25, and the information display unit 26, which are combined into an information display unit 02, and the information display unit 02 is used as an information display unit in the method for allocating an information display amount provided by this embodiment, as shown in Table 12.

TABLE 12

| Information display unit | Information display unit | Information display unit | Information display unit |
| --- | --- | --- | --- |
| Information display unit 11 | Information display unit 12 | Information display unit 21 | Information display unit 22 |
| Information display unit 02 | | | |

According to the method provided by this embodiment, an estimated display amount of unallocated information is determined according to a displayed amount of allocated information; and information displayed by each information display unit and a display amount are allocated according to a predetermined display amount of the unallocated information that is acquired from the estimated display amount and a remaining display amount of allocated information. Therefore, the remaining display amount of the allocated information then can be allocated to the unallocated information, so that utilization of an information display position is improved, and a manner of allocating an information display amount tends to be proper.

Figure 4:
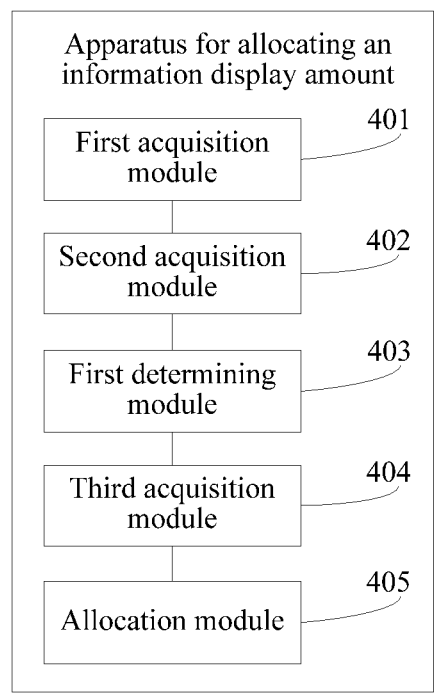
FIG. 4 is a schematic structural diagram of an apparatus for allocating an information display amount according to an embodiment of the present disclosure.

An embodiment provides an apparatus for allocating an information display amount, where the apparatus is configured to perform the method for allocating an information display amount provided in FIG. 1 and FIG. 2, and referring to FIG. 4, the apparatus includes: a first acquisition module 401, configured to acquire an original display amount of each information display unit; a second acquisition module 402, configured to acquire a displayed amount of allocated information; a first determining module 403, configured to determine an estimated display amount of unallocated information according to the original display amount of each information display unit that is acquired by the first acquisition module 401 and the displayed amount of the allocated information that is acquired by the second acquisition module 402; a third acquisition module 404, configured to acquire a predetermined display amount of the unallocated information according to the estimated display amount of the unallocated information that is determined by the first determining module 403; and an allocation module 405, configured to allocate information displayed by each information display unit and a display amount according to the predetermined display amount of the unallocated information that is acquired by the third acquisition module 404 and a remaining display amount of the allocated information.

Figure 5:
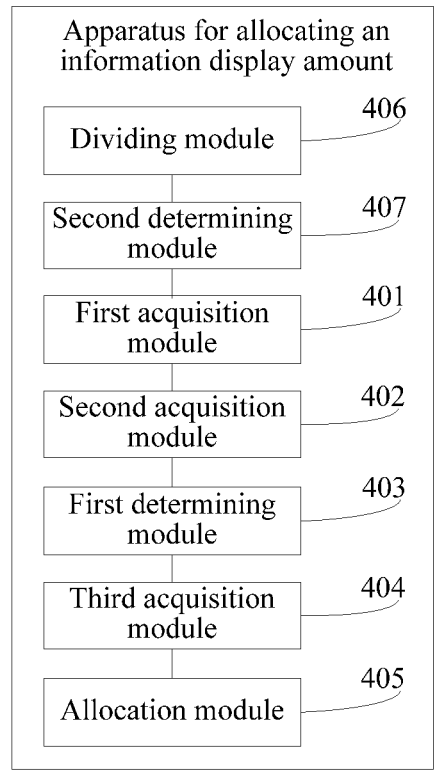
FIG. 5 is a schematic structural diagram of another apparatus for allocating an information display amount according to an embodiment of the present disclosure.

Referring to FIG. 5, the apparatus further includes: a dividing module 406, configured to divide each information display position into corresponding information display units according to at least one preset targeting condition; and a second determining module 407, configured to determine an original display amount of each information display unit obtained through division by the dividing module 406.

Figure 6:
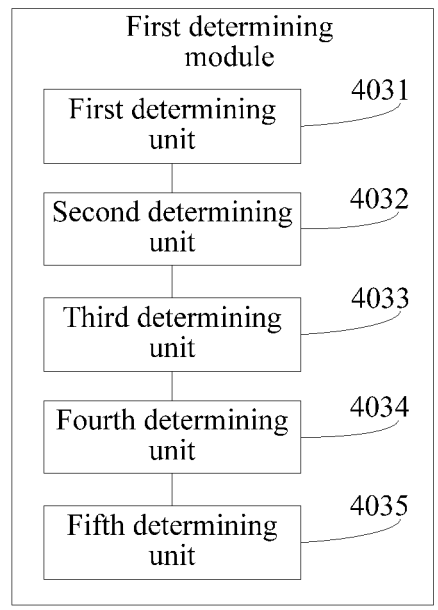
FIG. 6 is a schematic structural diagram of a first determining module according to an embodiment of the present disclosure.

Referring to FIG. 6, the first determining module 403 includes: a first determining unit 4031, configured to determine a remaining display amount of each information display unit according to the original display amount of each information display unit and the displayed amount of the allocated information; a second determining unit 4032, configured to determine an allocated display amount of each information display unit according to the remaining display amount of each information display unit that is determined by the first determining module 4031; a third determining unit 4033, configured to determine a preset display amount of the unallocated information; a fourth determining unit 4034, configured to determine, according to the allocated display amount of each information display unit that is determined by the second determining unit 4032, whether allocation of the preset display amount of the unallocated information that is determined by the third determining unit 4033 and the remaining display amount of the allocated information in each information display unit is successful; and a fifth determining unit 4035, configured to determine, if the fourth determining unit 4034 determines that allocation of the preset display amount of the unallocated information and the remaining display amount of the allocated information in each information display unit is successful, the preset display amount of the unallocated information as the estimated display amount corresponding to the unallocated information.

Figure 7:
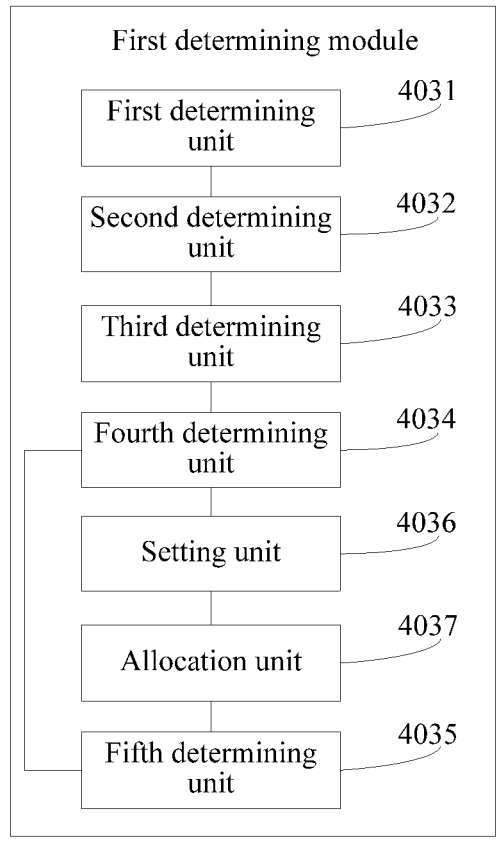
FIG. 7 is a schematic structural diagram of another first determining module according to an embodiment of the present disclosure.

Referring to FIG. 7, the first determining module 403 further includes: a setting unit 4036, configured to reset the preset display amount of the unallocated information if it is determined that allocation of the preset display amount of the unallocated information and the remaining display amount of the allocated information in each information display unit is unsuccessful; and an allocation unit 4037, configured to allocate the information displayed by each information display unit and the display amount according to the preset display amount of the unallocated information that is reset by the setting unit 4036 and the remaining display amount of the allocated information, until allocation is successful; and the fifth determining unit 4035 is configured to determine the preset display amount of the unallocated information when allocation is successful, as the estimated display amount of the unallocated information.

Figure 8:
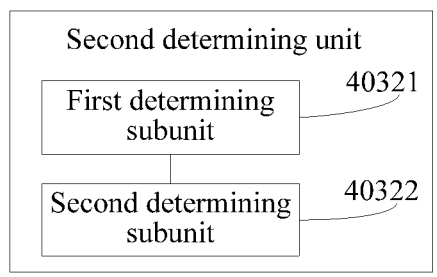
FIG. 8 is a schematic structural diagram of a second determining unit according to an embodiment of the present disclosure.

Referring to FIG. 8, the second determining unit 4032 includes: a first determining subunit 40321, configured to determine a reduction proportion; and a second determining subunit 40322, configured to determine the allocated display amount of each information display unit according to the reduction proportion determined by the first determining subunit 40321, and the original display amount and the remaining display amount of each information display unit; and the fourth determining unit 4034 is configured to determine, according to the allocated display amount of each information display unit, whether a total allocated display amount of all the information display units reaches the preset display amount of the unallocated information and the remaining display amount of the allocated information; and determine, if the total allocated display amount of each information display unit reaches the preset display amount of the unallocated information and the remaining display amount of the allocated information, allocation of the preset display amount of the unallocated information and the remaining display amount of the allocated information in each information display unit is successful.

Figure 9:
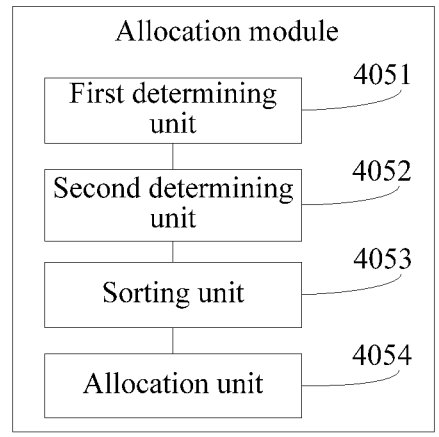
FIG. 9 is a first schematic structural diagram of an allocation module according to an embodiment of the present disclosure.

Referring to FIG. 9, the allocation module 405 includes: a first determining unit 4051, configured to determine an information display unit corresponding to the unallocated information and an information display unit corresponding to the allocated information; a second determining unit 4052, configured to determine a remaining display amount of the information display unit corresponding to the unallocated information and a remaining display amount of the information display unit corresponding to the allocated information, which are determined by the first determining unit 4051; a sorting unit 4053, configured to sort the information display unit corresponding to the unallocated information and the information display unit corresponding to the allocated information according to the remaining display amounts determined by the second determining unit 4052; and an allocation unit 4054, configured to allocate the predetermined display amount of the unallocated information and the remaining display amount of the allocated information to a corresponding information display unit according to a sorting result of the sorting unit 4053, to obtain the information displayed by each information display unit and the display amount.

Figure 10:
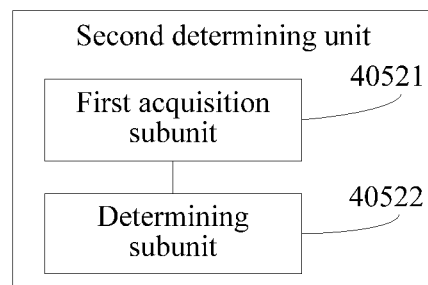
FIG. 10 is a schematic structural diagram of a second determining unit according to an embodiment of the present disclosure.

Referring to FIG. 10, the second determining unit 4052 includes: a first acquisition subunit 40521, configured to acquire, when the targeting condition includes a frequency limit, a frequency discount corresponding to the frequency limit; and a determining subunit 40522, configured to determine, according to the frequency discount acquired by the first acquisition subunit 40521, the remaining display amount of the information display unit corresponding to the unallocated information and the remaining display amount of the information display unit corresponding to the allocated information.

Figure 11:
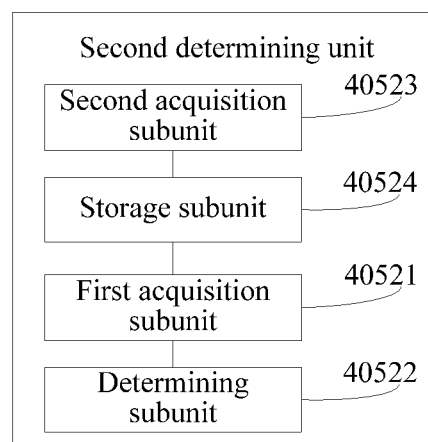
FIG. 11 is a schematic structural diagram of another second determining unit according to an embodiment of the present disclosure.

Referring to FIG. 11, the second determining unit 4052 further includes: a second acquisition subunit 40523, configured to acquire historical display information of each information display unit within past preset number of days; and a storage subunit 40524, configured to determine and store, according to the historical display information acquired by the second acquisition subunit 40523 and each preset frequency limit, a frequency discount corresponding to each preset frequency limit; and the first acquisition subunit 40521 is configured to select, from the frequency discounts corresponding to all the preset frequency limits and stored by the storage subunit 40524, the frequency discount corresponding to the frequency limit.

Figure 12:
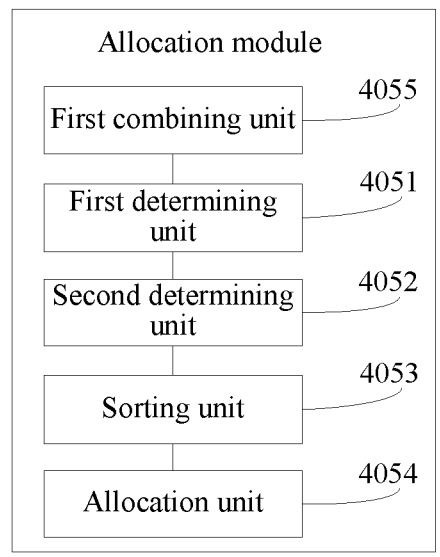
FIG. 12 is a second schematic structural diagram of an allocation module according to an embodiment of the present disclosure.

Referring to FIG. 12, the allocation module 405 further includes: a first combining unit 4055, configured to combine, if there are at least two information display units corresponding to both the unallocated information and the allocated information, the at least two information display units corresponding to both the unallocated information and the allocated information.

Figure 13:
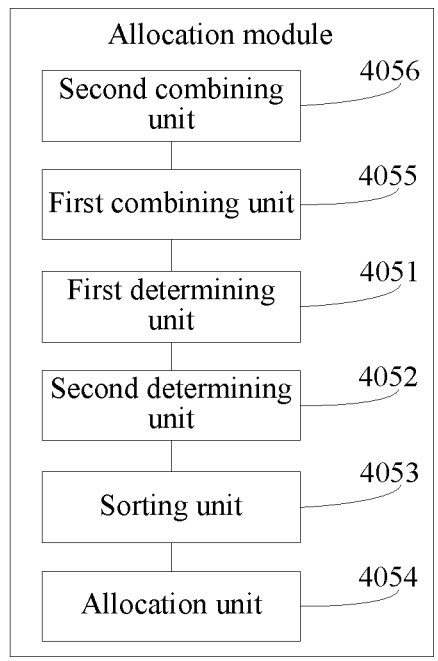
FIG. 13 is a third schematic structural diagram of an allocation module according to an embodiment of the present disclosure.

Referring to FIG. 13, the allocation module 405 further includes: a second combining unit 4056, configured to combine, if there are at least two information display units corresponding to neither the unallocated information nor the allocated information, the at least two information display units corresponding to neither the unallocated information nor the allocated information.

The apparatus provided by this embodiment determines an estimated display amount of unallocated information according to a displayed amount of allocated information; and allocates information displayed by each information display unit and a display amount according to a predetermined display amount of the unallocated information that is acquired from the estimated display amount and a remaining display amount of allocated information. Therefore, the remaining display amount of the allocated information then can be allocated to the unallocated information, so that utilization of an information display position is improved, and a manner of allocating an information display amount tends to be proper.

Figure 14:
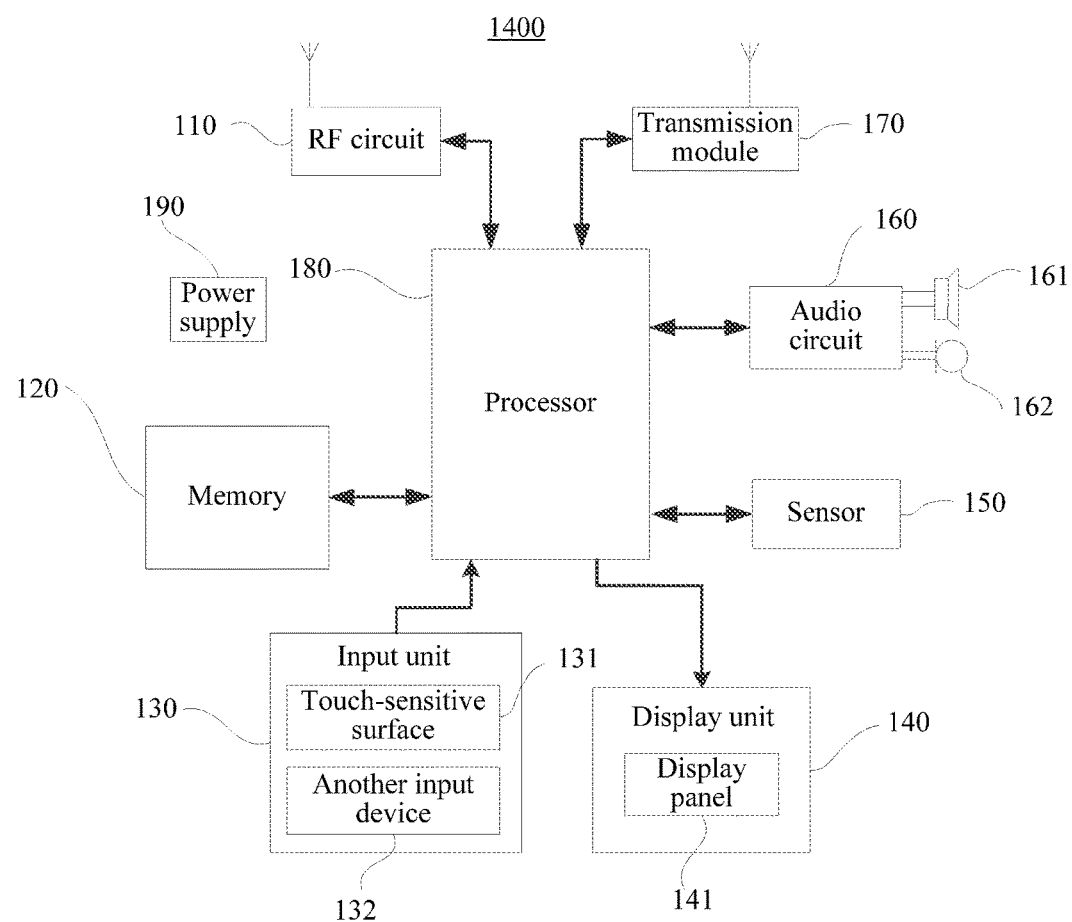
FIG. 14 is a schematic structural diagram of a terminal according to an embodiment of the present disclosure.

Referring to FIG. 14, an embodiment provides a terminal. FIG. 14 shows a schematic structural diagram of a terminal having a touch-sensitive surface involved in an embodiment of the present disclosure. The terminal can be configured to perform the methods for allocating an information display amount provided by the foregoing embodiment. The details are provided below.

The terminal 1400 may include components such as a radio frequency (RF) circuit 110, a memory 120 including one or more computer readable storage mediums, an input unit 130, a display unit 140, a sensor 150, an audio circuit 160, a transmission module 170, a processor 180 including one or more processing cores, and a power supply 190. A person skilled in the art may understand that the structure of the terminal shown in FIG. 14 does not constitute a limitation to the terminal, and the terminal may include more components or fewer components than those shown in the figure, or some components may be combined, or a different component deployment may be used.

The RF circuit 110 may be may be configured to receive and send signals during an information receiving and sending process or a call process. For example, the RF circuit 110 receives downlink information from a base station, then delivers the downlink information to one or more processors 180 for processing, and sends related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 110 may also communicate with a network and another device by wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 120 may be configured to store software program and software modules and units, for example, software programs, modules, and units corresponding to the apparatus for allocating an information display amount and a service system server in FIGS. 3-13.

The processor 180 runs the software program and module stored in the memory 120, to implement various functional applications and data processing, for example, to allocate an information display amount. In the present disclosure, when executed by the processor 180, the software programs, modules, and units, such as the ones described in relation to FIGS. 3-13, implement the functions as described in relation to FIGS. 3-13.

For example, the apparatus for allocating an information display amount, the first acquisition module 401, the second acquisition module 402, the first determining module 403, the third acquisition module 404, the allocation module 405, are computer programs stored in the memory 120. When executed by the processor 180, the apparatus for allocating an information display amount, the first acquisition module 401, the second acquisition module 402, the first determining module 403, the third acquisition module 404, the allocation module 405 may implement the functions as described in relation to FIG. 4.

Further, the dividing module 406 and the second determining module 407 are computer programs stored in the memory 120. When executed by the processor 180, the dividing module 406 and the second determining module 407 may implement the functions as described in relation to FIG. 5.

Further, the first determining unit 4031, and second determining unit 4032, and third determining unit 4033, the fourth determining unit 4034, the setting unit 4036, the allocation unit 4037, and fifth determining unit 4035, are computer programs stored in the memory 120. When executed by the processor 180, the first determining unit 4031, and second determining unit 4032, and third determining unit 4033, the fourth determining unit 4034, the setting unit 4036, the allocation unit 4037, and fifth determining unit 4035 may implement the functions as described in relation to FIGS. 6 and 7.

Further, the first determining subunit 40321 and the second determining subunit 40322 are computer programs stored in the memory 120. When executed by the processor 180, the first determining subunit 40321 and the second determining subunit 40322 may implement the functions as described in relation to FIG. 8.

Further, the first determining unit 4051, and second determining unit 4052, the sorting unit 4053, the allocation unit 4054, first combining unit 4055, and the second combining unit 4056 are computer programs stored in the memory 120. When executed by the processor 180, the first determining unit 4051, and second determining unit 4052, the sorting unit 4053, the allocation unit 4054, first combining unit 4055, and the second combining unit 4056 may implement the functions as described in relation to FIGS. 9, 12, and 13.

Further, the first acquisition subunit 40521, the determining subunit 40522, the second acquisition subunit 40523, and the storage subunit 40524, are computer programs stored in the memory 120. When executed by the processor 180, the first acquisition subunit 40521, the determining subunit 40522, the second acquisition subunit 40523, and the storage subunit 40524 may implement the functions as described in relation to FIGS. 10 and 11.

The memory 120 may mainly include a program storage area and a data storage area. The program storage area may store an operating system, an application program required by at least one function (such as a sound playback function and an image display function), and the like. The data storage area may store data (such as audio data and an address book) created according to use of the terminal 1400, and the like. In addition, the memory 120 may include a high speed random access memory, and may also include a non-volatile memory, such as at least one magnetic disk storage device, a flash memory, or another volatile solid-state storage device. Correspondingly, the memory 120 may further include a memory controller for the processor 180 and the input unit 130 to access the memory 120.

The input unit 130 may be configured to receive input digit or character information, and generate a keyboard, mouse, joystick, optical, or track ball signal input related to the user setting and function control. Specifically, the input unit 130 may include a touch-sensitive surface 131 and another input device 132. The touch-sensitive surface 131, which may also be referred to as a touch display screen or a touch panel, may collect a touch operation of a user on or near the touch-sensitive surface (such as an operation of a user on the touch-sensitive surface 131 or near the touch-sensitive surface 131 by using any suitable object or accessory, such as a finger or a stylus), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 180. Moreover, the touch controller can receive and execute a command sent from the processor 180. In addition, the touch-sensitive surface 131 may be a resistive, capacitive, infrared, or surface sound wave type touch-sensitive surface. In addition to the touch-sensitive surface 131, the input unit 130 may further include the another input device 132. Specifically, the another input device 132 may include, but is not limited to, one or more of a physical keyboard, a functional key (such as a volume control key or a switch key), a track ball, a mouse, and a joystick.

The display unit 140 may be configured to display information input by the user or information provided for the user, and various graphical user interfaces of the terminal 1400. The graphical user interfaces may be formed by a graph, a text, an icon, a video, or any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine the type of the touch event. Then, the processor 180 provides a corresponding visual output on the display panel 141 according to the type of the touch event. Although, in FIG. 14, the touch-sensitive surface 131 and the display panel 141 are used as two separate components to implement input and output functions, in some embodiments, the touch-sensitive surface 131 and the display panel 141 may be integrated to implement the input and output functions.

The terminal 1400 may further include at least one sensor 150, such as an optical sensor, a motion sensor, and other sensors. Specifically, the optical sensor may include an ambient light sensor and a proximity sensor. The ambient light sensor may adjust luminance of the display panel 141 according to brightness of the ambient light. The proximity sensor may switch off the display panel 141 and/or backlight when the terminal 1400 is moved to the ear. As one type of motion sensor, a gravity acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors such as a gyroscope, a barometer, a hygrometer, a thermometer, and an infrared sensor, which may be configured in the terminal 1400, are not further described herein.

The audio circuit 160, a loudspeaker 161, and a microphone 162 may provide audio interfaces between the user and the terminal 1400. The audio circuit 160 may convert received audio data into an electric signal and transmit the electric signal to the loudspeaker 161. The loudspeaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, so as to provide communication between a peripheral earphone and the terminal 1400.

The terminal 1400 may help, by using the transmission module 170, a user to receive and send an e-mail, browse a webpage, and access streaming media, and so on, which provides wireless or wired broadband Internet access for the user. Although FIG. 14 shows the transmission module 170, it may be understood that, the transmission module does not belong to a necessary constitution of the terminal 1400, and can be ignored according to demands without changing the scope of the essence of the present disclosure.

The processor 180 is the control center of the terminal 1400, and is connected to various parts of the terminal by using various interfaces and lines. By running or executing the software program and/or module stored in the memory 120, and invoking data stored in the memory 120, the processor 180 performs various functions and data processing of the terminal 1400, thereby performing overall monitoring on the terminal. Optionally, the processor 180 may include the one or more processing cores. Preferably, the processor 180 may integrate an application processor and a modem. The application processor mainly processes an operating system, a user interface, an application program, and the like. The modem mainly processes wireless communication. It may be understood that, the foregoing modem may be not integrated into the processor 180.

The terminal 1400 further includes the power supply 190 (such as a battery) for supplying power to the components. Preferably, the power supply may be logically connected to the processor 180 by using a power management system, thereby implementing functions, such as charging, discharging, and power consumption management, by using the power management system. The power supply 190 may further include one or more of a direct current or alternating current power supply, a re-charging system, a power failure detection circuit, a power supply converter or inverter, a power supply state indicator, and any other components.

Although not shown in the figure, the terminal 1400 may further include a camera, a Bluetooth module, and the like, which are not described in detail herein again. Specifically, in this embodiment, the display unit of the terminal is a touch screen display, and the terminal may further include a memory and one or more programs. The one or more programs are stored in the memory and configured to be executed by one or more processors.

The one or more programs contain instructions used for implementing the following operations: acquiring an original display amount of each information display unit, and acquiring a displayed amount of allocated information; determining an estimated display amount of unallocated information according to the original display amount of each information display unit and the displayed amount of the allocated information; acquiring a predetermined display amount of the unallocated information according to the estimated display amount of the unallocated information; and allocating information displayed by each information display unit and a display amount according to the predetermined display amount of the unallocated information and a remaining display amount of the allocated information.

To sum up, the terminal provided by this embodiment determines an estimated display amount of unallocated information according to a displayed amount of allocated information; and allocates information displayed by each information display unit and a display amount according to a predetermined display amount of the unallocated information that is acquired from the estimated display amount and a remaining display amount of allocated information. Therefore, the remaining display amount of the allocated information then can be allocated to the unallocated information, so that utilization of an information display position is improved, and a manner of allocating an information display amount tends to be proper.

An embodiment of the present disclosure provides a computer readable storage medium. The computer readable storage medium may be a computer readable storage medium included in the memory in the foregoing embodiment, and may also be a computer readable storage medium that exists separately and is not equipped into a terminal. The computer readable storage medium stores one or more programs, and the one or more programs are executed by one or more processors to perform the methods for allocating an information display amount as described in FIG. 1 and FIG. 2.

An embodiment of the present disclosure provides a graphical user interface. The graphical user interface is implemented on a terminal. The terminal includes a touch screen display, a memory, and one or more processors configured to execute one or more programs.

The graphical user interface includes: acquiring an original display amount of each information display unit, and acquiring a displayed amount of allocated information; determining an estimated display amount of unallocated information according to the original display amount of each information display unit and the displayed amount of the allocated information; acquiring a predetermined display amount of the unallocated information according to the estimated display amount of the unallocated information; and allocating information displayed by each information display unit and a display amount according to the predetermined display amount of the unallocated information and a remaining display amount of the allocated information.

It should be noted that, the above functional modules are only described for exemplary purposes when the terminal provided by the foregoing embodiment allocates an information display amount. In actual applications, the functions may be allocated to different functional modules according to specific needs, which means that the internal structure of the terminal is divided to different functional modules to complete all or some of the above described functions. In addition, the terminal provided by the foregoing embodiment is based on the same concept as the method for allocation an information display amount in the foregoing embodiments. For the specific implementation process, refer to the method embodiments, and the details are not described herein again.

The sequence numbers of the foregoing embodiments of the present disclosure are merely for the purpose of description, and do not represent the superiority or inferiority of the embodiments.

A person of ordinary skilled in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A method for allocating an information display amount, comprising:
   at a terminal having one or more processors and memory storing programs executed by the one or more processors:
   acquiring an original display amount of each information display, and acquiring a displayed amount of allocated information of a first advertisement order, wherein the displayed amount of the allocated information of the first advertisement order includes the display amount of an advertisement that is allocated to a display position of each information display;
   determining an estimated display amount of unallocated information of a second advertisement order according to the original display amount of each information display and the displayed amount of the allocated information, comprising:
   determining a first sum of original display amounts of information displays corresponding to the unallocated information;
   determining a second sum of original display amounts of information displays corresponding to the allocated information;
   sorting the unallocated information and the allocated information according to the first sum and the second sum;
   selecting one from the unallocated information and the allocated information based on an ascending order of the first sum and the second sum; and
   obtaining the estimated display amount of unallocated information of a second advertisement order based on the selected information;
   acquiring a predetermined display amount of the unallocated information according to the estimated display amount of the unallocated information; and
   allocating information displayed by each information display and a display amount according to the predetermined display amount of the unallocated information and a remaining display amount of the allocated information;
   wherein the first advertisement order and the second advertisement order comprise at least one preset targeting condition, and the at least one preset targeting condition includes a region condition or a gender condition.

2. The method according to claim 1, wherein the acquiring the original display amount of each information display comprises:
   dividing each information display position into corresponding information displays according to the at least one preset targeting condition, and determining an original display amount of each information display.

3. The method according to claim 1, wherein the determining the estimated display amount of unallocated information of the second advertisement order according to the original display amount of each information display and the displayed amount of the allocated information comprises:
   determining a remaining display amount of each information display according to the original display amount of each information display and the displayed amount of the allocated information;
   determining an allocated display amount of each information display according to the remaining display amount of each information display;
   determining a preset display amount of the unallocated information;
   determining, according to the allocated display amount of each information display, whether allocation of the preset display amount of the unallocated information and the remaining display amount of the allocated information in each information display is successful; and
   determining, if it is determined that allocation of the preset display amount of the unallocated information and the remaining display amount of the allocated information in each information display is successful, the preset display amount of the unallocated information as the estimated display amount corresponding to the unallocated information.

4. The method according to claim 3, after the determining, according to the allocated display amount of each information display, whether allocation of the preset display amount of the unallocated information and the remaining display amount of the allocated information in each information display is successful, further comprising:
   resetting the preset display amount of the unallocated information if it is determined that allocation of the preset display amount of the unallocated information and the remaining display amount of the allocated information in each information display is unsuccessful, allocating the information displayed by each information display and the display amount according to the preset display amount of the unallocated information that is reset and the remaining display amount of the allocated information, until allocation is successful, and determining the preset display amount of the unallocated information when allocation is successful, as the estimated display amount of the unallocated information.

5. The method according to claim 3, wherein the determining an allocated display amount of each information display according to the remaining display amount of each information display comprises:
- determining a reduction proportion, and determining the allocated display amount of each information display according to the reduction proportion, and the original display amount and the remaining display amount of each information display; and
- the determining, according to the allocated display amount of each information display, whether allocation of the preset display amount of the unallocated information and the remaining display amount of the allocated information in each information display is successful comprises:
- determining, according to the allocated display amount of each information display, whether a total allocated display amount of all the information displays reaches the preset display amount of the unallocated information and the remaining display amount of the allocated information; and
- determining, if the total allocated display amount of all the information displays reaches the preset display amount of the unallocated information and the remaining display amount of the allocated information, that allocation of the preset display amount of the unallocated information and the remaining display amount of the allocated information in each information display is successful.

6. The method according to claim 1, wherein the allocating information displayed by each information display and the display amount according to the predetermined display amount of the unallocated information and the remaining display amount of the allocated information comprises:
- determining an information display corresponding to the unallocated information and an information display corresponding to the allocated information, and determining a remaining display amount of the information display corresponding to the unallocated information and a remaining display amount of the information display corresponding to the allocated information; and
- sorting the information display corresponding to the unallocated information and the information display corresponding to the allocated information according to the remaining display amounts, and allocating the predetermined display amount of the unallocated information and the remaining display amount of the allocated information to a corresponding information display according to a sorting result, to obtain the information displayed by each information display and the display amount.

7. The method according to claim 6, wherein the determining the remaining display amount of the information display corresponding to the unallocated information and the remaining display amount of the information display corresponding to the allocated information comprises:
- acquiring, if the targeting condition further comprises a frequency limit, a frequency discount corresponding to the frequency limit, and determining, according to the frequency discount, the remaining display amount of the information display corresponding to the unallocated information and the remaining display amount of the information display corresponding to the allocated information.

8. The method according to claim 7, before acquiring the frequency discount corresponding to the frequency limit, further comprising:
- acquiring historical display information of each information display within past preset number of days; and
- determining and storing, according to the historical display information and each preset frequency limit, a frequency discount corresponding to each preset frequency limit; and
- the acquiring a frequency discount corresponding to the frequency limit comprises:
- selecting, from the stored frequency discounts corresponding to all the preset frequency limits, the frequency discount corresponding to the frequency limit.

9. The method according to claim 6, before the determining the information display corresponding to the unallocated information and the information display corresponding to the allocated information, further comprising:
- combining, if there are at least two information displays corresponding to both the unallocated information and the allocated information, the at least two information displays corresponding to both the unallocated information and the allocated information.

10. The method according to claim 6, before the determining the information display corresponding to the unallocated information and the information display corresponding to the allocated information, further comprising:
- combining, if there are at least two information displays corresponding to neither the unallocated information nor the allocated information, the at least two information displays corresponding to neither the unallocated information nor the allocated information.

11. An apparatus for allocating an information display amount, comprising:
- one or more processors;
- a memory coupled to the one or more processors, the one or more processors are configured to
- acquire an original display amount of each information display;
- acquire a displayed amount of allocated information of a first advertisement order, wherein the displayed amount of the allocated information of the first advertisement order includes the display amount of an advertisement that is allocated to a display position of each information display;
- determine an estimated display amount of unallocated information of a second advertisement order according to the original display amount of each information display and the displayed amount of the allocated information, comprising:
  - determine a first sum of original display amounts of information displays corresponding to the unallocated information;
  - determine a second sum of original display amounts of information displays corresponding to the allocated information;
  - sort the unallocated information and the allocated information according to the first sum and the second sum; and
  - select one from the unallocated information and the allocated information based on an ascending order of the first sum and the second sum; and
  - obtain the estimated display amount of unallocated information of a second advertisement order based on the selected information;
- acquire a predetermined display amount of the unallocated information according to the estimated display amount of the unallocated information; and
- allocate information displayed by each information display and a display amount according to the predetermined display amount of the unallocated information and a remaining display amount of the allocated information;

wherein the first advertisement order and the second advertisement order comprise at least one preset targeting condition, and the at least one preset targeting condition includes a region condition or a gender condition.

12. The apparatus according to claim 11, wherein the one or more processors are further configured to divide each information display position into corresponding information displays according to at least one preset targeting condition; and determine an original display amount of each information display obtained through division by the dividing module.

13. The apparatus according to claim 11, wherein the one or more processors are further configured to determine a remaining display amount of each information display according to the original display amount of each information display and the displayed amount of the allocated information;

determine an allocated display amount of each information display according to the remaining display amount of each information display;

determine a preset display amount of the unallocated information;

determine, according to the allocated display amount of each information display, whether allocation of the preset display amount of the unallocated information and the remaining display amount of the allocated information in each information display is successful; and determine, if allocation of the preset display amount of the unallocated information and the remaining display amount of the allocated information in each information display is determined successful, the preset display amount of the unallocated information as the estimated display amount corresponding to the unallocated information.

14. The apparatus according to claim 13, wherein the one or more processors are further configured to reset the preset display amount of the unallocated information if allocation of the preset display amount of the unallocated information and the remaining display amount of the allocated information in each information display is determined unsuccessful; and allocate the information displayed by each information display and the display amount according to the preset display amount of the unallocated information and the remaining display amount of the allocated information, until allocation is successful; and determine the preset display amount of the unallocated information when allocation is successful, as the estimated display amount of the unallocated information.

15. The apparatus according to claim 13, wherein the one or more processors are further configured to determine a reduction proportion; and determine the allocated display amount of each information display according to the reduction proportion, and the original display amount and the remaining display amount of each information display; and determine, according to the allocated display amount of each information display, whether a total allocated display amount of all the information displays reaches the preset display amount of the unallocated information and the remaining display amount of the allocated information; and determine, if the total allocated display amount of all the information displays reaches the preset display amount of the unallocated information and the remaining display amount of the allocated information, that allocation of the preset display amount of the unallocated information and the remaining display amount of the allocated information in each information display is successful.

16. The apparatus according to claim 11, wherein the one or more processors are further configured to determine an information display corresponding to the unallocated information and an information display corresponding to the allocated information;

determine a remaining display amount of the information display corresponding to the unallocated information and a remaining display amount of the information display corresponding to the allocated information;

sort the information display corresponding to the unallocated information and the information display corresponding to the allocated information according to the remaining display amounts; and allocate the predetermined display amount of the unallocated information and the remaining display amount of the allocated information to a corresponding information display according to a sorting result, to obtain the information displayed by each information display and the display amount.

17. The apparatus according to claim 16, wherein the one or more processors are further configured to acquire, when the targeting condition further comprises a frequency limit, a frequency discount corresponding to the frequency limit; and determine, according to the frequency discount, the remaining display amount of the information display corresponding to the unallocated information and the remaining display amount of the information display corresponding to the allocated information.

18. The apparatus according to claim 17, wherein the one or more processors are further configured to acquire historical display information of each information display within past preset number of days; and determine and store, according to the historical display information and each preset frequency limit, a frequency discount corresponding to each preset frequency limit; and select, from the frequency discounts corresponding to all the preset frequency limits, the frequency discount corresponding to the frequency limit.

19. The apparatus according to claim 16, wherein the one or more processors are further configured to combine, if there are at least two information displays corresponding to both the unallocated information and the allocated information, the at least two information displays corresponding to both the unallocated information and the allocated information.

20. The apparatus according to claim 16, wherein the one or more processors are further configured to combine, if there are at least two information displays corresponding to neither the unallocated information nor the allocated information, the at least two information displays corresponding to neither the unallocated information nor the allocated information.

* * * * *